Figure 1:
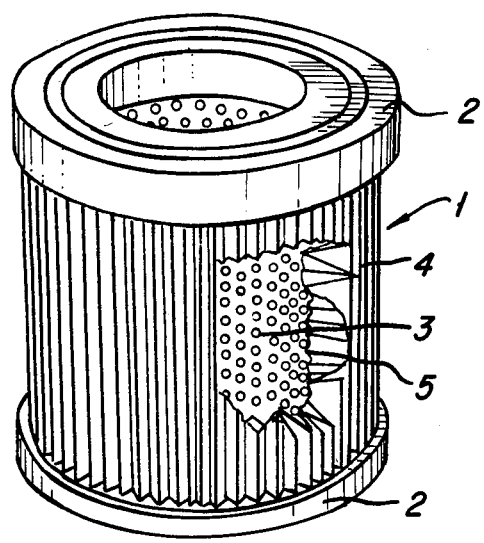

United States Patent [19]

Moldow

[11] Patent Number: 4,560,477
[45] Date of Patent: Dec. 24, 1985

[54] SEPARATOR FOR FILTER CARTRIDGES

[75] Inventor: Preben G. Moldow, Hägendorf, Switzerland

[73] Assignee: 501 P.M. Filter Konstruktionen, Switzerland

[21] Appl. No.: 553,778

[22] Filed: Nov. 21, 1983

[30] Foreign Application Priority Data

Nov. 22, 1982 [DK] Denmark .............................. 5187/82

[51] Int. Cl.$^4$ ............................................. B01D 27/06
[52] U.S. Cl. ...................................... 210/457; 55/498; 55/521; 210/483; 210/493.1; 210/497.01
[58] Field of Search ................. 55/497, 498, 499, 501, 55/521; 210/483, 484, 493.1, 493.2, 493.3, 493.4, 493.5, 497.01, 457

[56] References Cited

U.S. PATENT DOCUMENTS

| 2,988,227 | 6/1961 | Harms | 210/493.2 |
| 3,243,943 | 4/1966 | Gretzin | 210/493.3 X |
| 3,720,323 | 3/1973 | Landree | 210/493.2 |
| 4,075,106 | 2/1978 | Yamazaki | 210/493.1 X |
| 4,151,095 | 4/1979 | Wright | 210/493.5 |
| 4,154,688 | 5/1979 | Pall | 210/493.1 X |

FOREIGN PATENT DOCUMENTS 1512958 6/1978 United Kingdom ............. 210/493.3

Primary Examiner—Richard V. Fisher
Assistant Examiner—W. Gary Jones
Attorney, Agent, or Firm—Larson & Taylor

[57] ABSTRACT

At preferably circular filter cartridges, where pleated filter material is placed around a centrally arranged perforated tube, this filter material can be sucked to collapse if the pressure gradient through the material becomes large, whereby the advantages having a pleated filter cartridge with a relatively large filter surface and a very little volume are lost.

One means for preventing such collapse is using a separator which is arranged in each pleat of the filter material, whereby the separator includes a rigid organic foil formed in a pyramidal pleating, the amplitude of this pleating increasing from zero in the edge of the pleat of the filter material to maximum at the centrally arranged perforated tube constituting the base of the pleat of the filter material. Manufacturing a light construction of a filter cartridge is hereby obtained which is able to resist pressure gradients up to a certain limit without being sucked to collapse.

With the separators it is secured that the capacity of the filter is present during the lifetime of the filter independent of the pressure difference between outside and inside of the filter material.

5 Claims, 2 Drawing Figures

U.S. Patent     Dec. 24, 1985     4,560,477

SEPARATOR FOR FILTER CARTRIDGES

The invention relates to a separator for preferably circular filter cartridges, where pleated filter material is placed around a centrally arranged perforated tube, whereby a separator is arranged in each pleat of the filter.

Hitherto separators have been dispensed with in the filter material, as the paper that still is used for other purposes is so rigid, that it so far not has been necessary to support it.

However, the filter material can be sucked to collapse if the pressure gradient through the material becomes large, whereby the advantages having a pleated filter cartridge with a relatively large filter surface and a very little volume are lost.

One means for preventing such collapse has so far been a pleated wire mesh that both constitutes a complicated solution and loads huge cost of manufacturing and assemblying on the production.

In a certain type of filter cartridges it has been proposed to oppose this inconvenience by using separators in say quadratic filter cells, where corrugated aluminium foil is used as separator as a support for the filter material. This attempt, too, constitutes a complicated and expensive solution.

It is among the objects of the present invention to provide separators for preferably circular filter cartridges, where the above mentioned drawbacks are avoided, and where the separators can be produced of an inexpensive material having a trifling weight that is easy to manufacture and where the costs of production are low.

In one aspect therefore, the invention provides a separator comprising a rigid organic foil formed in a pyramidal pleating, the amplitude of this pleating increasing from zero in the edge of the pleat of the filter material to maximum at the centrally arranged perforated tube constituting the base of the pleat of the filter material. Manufacturing a light construction a filter cartridge is hereby obtained which is able to resist pressure gradients up to a certain limit without being sucked to collapse.

The separator's proof against pressure depends on the capability of the material to keep the pleating. In another appropriate aspect of the invention the separator is made of a formstable plastics, preferably polycarbonate. With this formstable pleating of the separator it is secured that the filter can resist even large pressure gradients, securing during the lifetime of the filter that all the filter surface is available for filtering.

Figure 2:
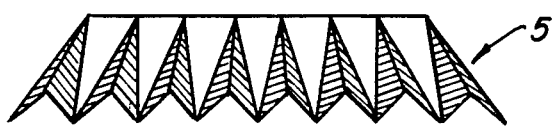

The invention will now be further described with reference to the drawings, in which FIG. 1 is a perspective view of a filter cartridge incorporating the invention and FIG. 2 is a plan view of a separator employed in the filter cartridge of FIG. 1.

A filter cartridge 1 consists of two end flanges 2, being able to constitute fixing flanges for the cartridge, and between these end flanges a tube-shaped, concentric arranged supporting device 3, being a tube 3 formed from a perforated sheet. The pleated filter material 4 is put around the tube 3. The central tube 3 constitutes the base of the pleat of the filter material and supports by its presence the separators 5 in the pleats and prevents a collapse by suction of the filter material 4.

During the employment of the filter catridge in a filter the particle holding air flow passes from the outside of the filter cartridge through the filter material 4 and the central tube 3 and out through one of the end flanges 2. The pleats of the filter material are, dependent of the pressure difference between the outside and the inside of the filter cartridge, subjected to a certain pressure force, which with the flow resistance caused by the filter material 4 contributes to support the filter material 4 to the tube 3. The pressure force can after some employment of the filter increase as the amount of particles being caught in the filter and thereby the flow resistance are increased. Without separators the filter material would be sucked to collapse, whereby the pleats would be differently distributed around the circumference of the filter cartridge. In the limiting case only a small portion of the filter material would be left as a working filter, which rapidly would lower the capacity of the filter and would call for cleansing or replacement.

With the separators 5 according to the invention it is secured that the capacity of the filter is present during the lifetime of the filter independent of the pressure difference between outside and inside of the filter material.

I claim:

1. In a separator arrangement for filter cartridges wherein a pleated filter element is disposed around a centrally located perforated tube and wherein separators are located in the pleats of the filter element, the improvement wherein the separators each comprise an elongate member providing substantial rigidity and extending along substantially the entire length of the filter pleat in which the separator is located, said separators each including pyramidal pleats therein which extend generally transverse to the filter pleat in which the separator is located, each separator member extending between the perforated tube at one lateral edge and the apex of the filter pleat in which the separator is located at the other lateral edge and the amplitude of the separator pleats in each separator member increasing from substantially zero at the edge of the separator member adjacent to the apex of the filter element pleat in which the separator member is located to a maximum at the edge adjacent to the perforated tube.

2. A separator arrangement as claimed in claim 1 wherein said separator member comprises a foil member.

3. A separator arrangement as claimed in claim 1 wherein said separator member is fabricated of plastic.

4. A separator member as claimed in claim 3 wherein said separator member is fabricated of a polycarbonate.

5. A separator arrangement as claimed in claim 1 wherein said filter cartridge is circular in cross section and wherein said perforated tube is circular in cross section.

* * * * *